No. 753,820. PATENTED MAR. 1, 1904.
W. C. BAKER.
ANTIFRICTION BEARING.
APPLICATION FILED FEB. 24, 1902.
NO MODEL.
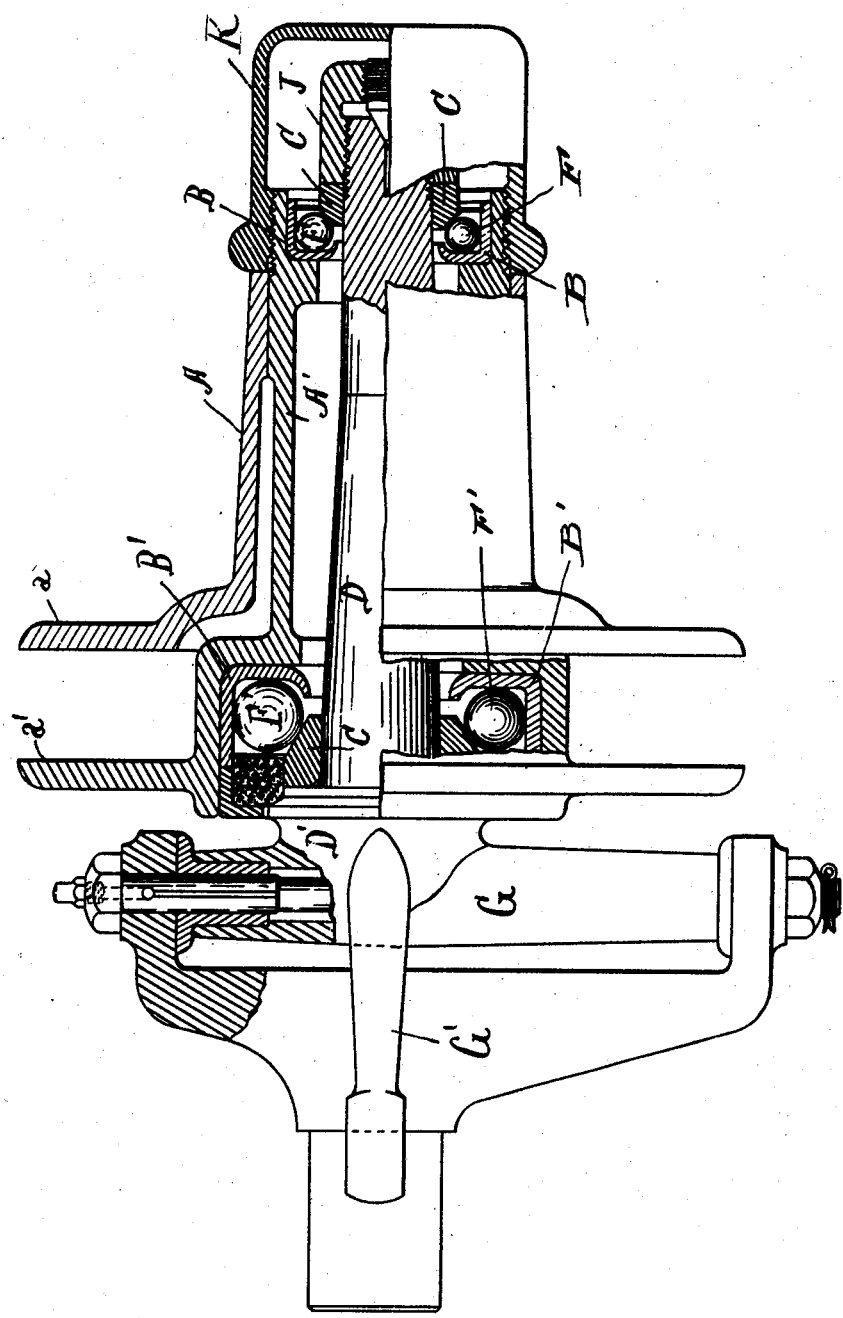
Witnesses:
A. L. Lord.
E. B. Donnelly.
Inventor.
Walter C. Baker
by
W. E. Donnelly
his Att'y No. 753,820.                                                                 Patented March 1, 1904.

UNITED STATES PATENT OFFICE.

WALTER C. BAKER, OF CLEVELAND, OHIO, ASSIGNOR TO THE AMERICAN BALL-BEARING COMPANY, OF CLEVELAND, OHIO, A CORPORATION OF OHIO.

ANTIFRICTION-BEARING.

SPECIFICATION forming part of Letters Patent No. 753,820, dated March 1, 1904.

Application filed February 24, 1902. Serial No. 95,182. (No model.)

*To all whom it may concern:*

Be it known that I, WALTER C. BAKER, a citizen of the United States, residing at Cleveland, in the county of Cuyahoga and State of Ohio, have invented certain new and useful Improvements in Antifriction-Bearings; and I do hereby declare the following to be a full, clear, and exact description of the invention, such as will enable others skilled in the art to which it pertains to make and use the same.

My invention relates to antifriction-bearings, and more particularly to those employed in connection with automobile running-gears; and the primary object thereof is to so arrange the bearings with respect to the knuckle of the steering mechanism that the strain brought on the steering-gear as a whole will be reduced to a minimum.

My invention further consists in details of construction and combination of parts, which will be hereinafter fully set forth and claimed.

The drawing illustrates an antifriction-bearing which embodies my invention and illustrates the same in side elevation, parts being broken away.

Referring to the drawing, A A' represent a two-part hub provided each with a spoke-flange $a\ a'$, respectively. The parts A and A' are preferably made adjustable in relation to each other in a longitudinal direction, thus allowing of the flanges $a\ a'$ being located at varying predetermined distances from each other. The inner part A' of the hub forms the casing which contains the cup-races B and B', the one being located at the outer end of the hub, as at B, and the other being located within lines including the tread portion of the wheel, or, in other words, approximately so, between the flanges $a$ and $a'$. These cup-races B B' may be of any suitable construction; but I prefer to form them, as shown clearly in the drawing, separate from the casing and formed of hard metal, preferably of plate-steel struck up or pressed in shape and inserted in their respective seats within the part A' of the hub.

C' represents a cone which is loosely but snugly mounted upon the axle or spindle D at the inner portion of said axle or spindle and abutting the collar D' of the same. The axle or spindle D is at its inner portion formed of greater diameter than at its outer portion and is preferably formed with a surface parallel to the axial line at that part where the cone C' is placed and from thence tapers outward and inward toward the axial line to a point at or near the outer bearing. The cone C' is so adjusted to the axle or spindle D as to be capable of revolving around said axle for the purpose of presenting new wearing-surfaces at the point of greater stress.

F' represents one of a series of balls which are located between the race-cup B' and the cone C' and are adjusted so as to be in approximately a central position relative to the traction-line and tread of the wheel, or, in other words, the balls F' are located between the flanges $a\ a'$, thus bringing the load to directly bear between the cup-race B', balls F', cone C', and axle D centrally in relation to the tread and traction of the wheel. On account of the space which may be utilized at this point of the wheel by enlarging the hub portion I am enabled to employ larger balls with corresponding parts at a point where they are required, and thus diminish the friction and reduce the wearing of the parts to a minimum and also to bring the wheel closer to the steering-knuckle G, which reduces the leverage, and hence the strain, upon said steering-knuckle G at all points of stress between the assembled parts of said knuckle. Also the closeness of the wheel to the knuckle G reduces the leverage as between the wheel, the pivotal portion of the knuckle, spindle G, and hence to the steering-gearing connected to said steering-arm G'.

At the outer end or near the outer end of the axle or spindle D, I provide a cone C, which is so mounted upon said axle D as to be free to revolve around the same, while at the same time snugly fitting said axle at this point. This cone C is capable also of longitudinal movement in relation to this end of the axle D for the purpose of adjustment. A series of balls F, of lesser diameter than the balls F', are here located between the cup-race B and cone C. The object or function of these balls F, in connection with the cone C and race B, is to sustain the bearing B', C', and F' in respective relation and adjustment and act auxiliary to said bearing to retain the adjustment and support the same. It will, however, be seen that no very important stress or load is placed upon these balls or upon this bearing B, C, and F, and hence they can be reduced in size, permitting uniformity in the structure of the hub and economy in assemblage and structural features. Any means for adjusting the cone C, and thus through it adjusting the bearings B C F and B' C' F', may be employed—such as a cup-nut J illustrated, which is provided with an internal screw-thread registering with an external screw-thread on the outer end of the axle D, the said cup-nut J abutting against the cone C and adapted to move the same longitudinally of the axle or spindle D, and thus drawing the cone C', which is placed against the collar D', toward the cone C, or vice versa, which adjusts the bearing as a whole by one movement of the cup-nut J.

Suitable means may be employed for locking the cup-nut J after the parts have been properly adjusted.

A cap K incloses the outer end of the bearing, including the outer end of the axle or spindle D, and suitable packing is also employed, such as K', at the inner end of the axle for preventing foreign substances—such as water, dust, or grit—from entering the bearing portion of the device.

What I claim is—

1. In combination with the spindle, and the hub, two sets of balls interposed between said spindle and hub adjacent the ends thereof, said balls being of different sizes, the larger of said balls being located in line with the traction and tread of the wheel, and a steering-knuckle carried by said spindle in juxtaposition to the larger balls.

2. In combination with the spindle formed adjacent its inner end with a collar, a loose cone abutting said collar, a cone on the outer end of the shaft, a hub, races for different sizes of balls in the ends of said hub, balls arranged in said races and engaging the cones, the larger balls being located in line with the tread of the wheel, and a steering-knuckle carried by the collar of said spindle in juxtaposition to the large balls.

3. In combination with the spindle, a collar carried adjacent the inner end thereof, and the steering-knuckle formed integral with said collar, a hub provided at its inner end with spoke-flanges, cones mounted on said spindle the inner end of which engages said collar, balls carried in the ends of the last hub and engaging the cones, said balls being of different sizes, the larger being in alinement with the spoke-flanges of the hub, and means carried by the spindle for adjusting the outer cone.

Signed at Cleveland, in the county of Cuyahoga and State of Ohio, this 14th day of February, 1902.

WALTER C. BAKER.

Witnesses:
E. B. DONNELLY,
W. E. DONNELLY.